US012657916B2

(12) United States Patent
Kong et al.

(10) Patent No.: US 12,657,916 B2
(45) Date of Patent: Jun. 16, 2026

(54) MODEL GENERATION METHOD AND MODEL GENERATION SYSTEM

(71) Applicant: TOYOTA JIDOSHA KABUSHIKI KAISHA, Aichi-ken (JP)

(72) Inventors: Quan Kong, Toshima-ku (JP);
Hsuan-Kung Yang, Minato-ku (JP);
Norimasa Kobori, Nakano-ku (JP);
Lijin Yang, Koto-ku (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 302 days.

(21) Appl. No.: 18/635,006

(22) Filed: Apr. 15, 2024

(65) Prior Publication Data

US 2024/0386721 A1     Nov. 21, 2024

(30) Foreign Application Priority Data

May 19, 2023     (JP) ................................. 2023-083333

(51) Int. Cl.
*G06V 20/40*          (2022.01)
*G06F 40/279*        (2020.01)
*G06V 10/776*        (2022.01)

(52) U.S. Cl.
CPC ............ *G06V 20/46* (2022.01); *G06F 40/279* (2020.01); *G06V 10/776* (2022.01); *G06V 20/48* (2022.01)

(58) Field of Classification Search
CPC ...... G06V 20/46; G06V 10/776; G06V 20/48; G06V 20/49; G06F 40/279
See application file for complete search history.

(56) References Cited

U.S. PATENT DOCUMENTS

2020/0125923 A1*  4/2020  Jones .................. G06F 18/2433
2021/0150546 A1*  5/2021  Zhu .................... G06Q 30/0282
(Continued)

FOREIGN PATENT DOCUMENTS

CN       1111582170      *  8/2020
JP       2021-189892  A    12/2021
(Continued)

OTHER PUBLICATIONS

Xiao, Huanhou, and Jinglun Shi. "Video captioning with adaptive attention and mixed loss optimization." IEEE Access 7 (2019): 135757-135769. (Year: 2019).*

*Primary Examiner* — Andrae S Allison
(74) *Attorney, Agent, or Firm* — HAUPTMAN HAM, LLP

(57) ABSTRACT

A model generation method for generating a video extraction model for extracting a matching interval in a video that matches contents of an input sentence is provided. In the model generation method, a base matching interval and a sub matching interval in a training video are extracted by inputting a base sentence and a sub sentence to the video extraction model. Next, a loss for each of ground truth interval, the base matching interval, and the sub matching interval is calculated by processing a learning task of reconstructing the base sentence based on a feature value of the training video corresponding to each of them. Then, a machine learning is performed such that the first loss related to the ground truth interval is smaller than the second loss related to the base matching interval, and the second loss is smaller than the loss related to the sub matching interval.

5 Claims, 6 Drawing Sheets

(56)                    References Cited

U.S. PATENT DOCUMENTS

| | | | |
|---|---|---|---|
| 2022/0129699 A1* | 4/2022 | Noroozi ................. | G06V 10/95 |
| 2022/0261550 A1* | 8/2022 | Moon ..................... | G06F 40/30 |
| 2022/0382987 A1* | 12/2022 | Katz ..................... | G06F 40/289 |
| 2023/0083476 A1* | 3/2023 | Moon ..................... | G06V 20/46 |
| | | | 707/772 |

FOREIGN PATENT DOCUMENTS

| | | | |
|---|---|---|---|
| JP | 2022-072444 A | 5/2022 | |
| WO | 2021/182199 A1 | 9/2021 | |

* cited by examiner

MODEL GENERATION METHOD AND MODEL GENERATION SYSTEM

CROSS-REFERENCE TO RELATED APPLICATION

The present disclosure claims priority to Japanese Patent Application No. 2023-083333, filed on May 19, 2023, the contents of which application are incorporated herein by reference in their entirety.

TECHNICAL FIELD

The present disclosure relates to a technique for generating a machine learning models.

BACKGROUND ART

In recent years, a technique has been proposed for generating a machine learning model that enables various tasks to be processed appropriately.

For example, Patent Literature 1 discloses a technique for generating a machine learning model for processing a task of inputting data of a plurality of different modalities and outputting data of a different modality than the input.

In addition, there are the following Patent Literature 2 and Patent Literature 3 as documents showing the technical level of this technical field.

LIST OF RELATED ART

Patent Literature 1: WO 2021/182199 A1
Patent Literature 2: JP 2022/072444 A
Patent Literature 3: JP 2021/189892 A

SUMMARY

There is a task to extract, using a sentence as a query, an interval in a video that matches the contents of the sentence. Conventionally, a machine learning model for processing such a task (hereinafter, simply referred to as a "video extraction model") has not been able to achieve sufficient generalization performance for various sentences that are queries.

An object of the present disclosure is to provide a technique that enables the generation of a video extraction model with high generalization performance for various input sentences.

A first aspect of the present disclosure relates to a model generation method for generating a video extraction model for extracting a matching interval in a video that matches contents of an input sentence.

The model generation method, which is executed by a computer, comprises inputting a plurality of sentences into the video extraction model and extracting a plurality of matching intervals in a training video with respect to the plurality of sentences.

The plurality of sentences includes a base sentence and at least one sub sentence shorter than the base sentence.

The at least one sub sentence includes at least one of a positive sub sentence and a negative sub sentence, the positive sub sentence including a word included in the base sentence and not including a noise word unrelated to the base sentence, the negative sub sentence including at least the noise word.

The plurality of matching intervals includes a base matching interval corresponding to the base sentence and at least one sub matching interval corresponding to the at least one sub sentence.

The model generation method further comprises:

calculating a first loss by processing a learning task of reconstructing the base sentence based on a feature value of the training video corresponding to a ground truth interval;

calculating a second loss by processing the learning task based on the feature value of the training video corresponding to the base matching interval;

calculating at least one sub loss by processing the learning task based on the feature value of the training video corresponding to the at least one sub matching interval; and performing machine learning of the video extraction model such that the first loss is smaller than the second loss and the second loss is less than the at least one sub loss.

A second aspect of the present disclosure relates to a model generation system for generating a video extraction model for extracting a matching interval in a video that matches contents of an input sentence.

The model generation system comprises one or more processors configured to execute inputting a plurality of sentences into the video extraction model and extracting a plurality of matching intervals in a training video with respect to the plurality of sentences.

The plurality of sentences includes a base sentence and at least one sub sentence shorter than the base sentence.

The at least one sub sentence includes at least one of a positive sub sentence and a negative sub sentence, the positive sub sentence including a word included in the base sentence and not including a noise word unrelated to the base sentence, the negative sub sentence including at least the noise word.

The plurality of matching intervals includes a base matching interval corresponding to the base sentence and at least one sub matching interval corresponding to the at least one sub sentence.

The one or more processors are further configured to execute:

calculating a first loss by processing a learning task of reconstructing the base sentence based on a feature value of the training video corresponding to a ground truth interval;

calculating a second loss by processing the learning task based on the feature value of the training video corresponding to the base matching interval;

calculating at least one sub loss by processing the learning task based on the feature value of the training video corresponding to the at least one sub matching interval; and performing machine learning of the video extraction model such that the first loss is smaller than the second loss and the second loss is less than the at least one sub loss.

According to the present disclosure, machine learning of the video extraction model is performed so as to also focus on the content of a part of an input sentence. It is thus possible to generate the video extraction model with high generalization performance for various input sentences.

DETAILED DESCRIPTION

Hereinafter, the present embodiment will be described with reference to the drawings.

1. Video Extraction Model

The model generation method according to the present embodiment generates a video extraction model for extracting a interval (hereinafter, referred to as a "matching interval") matching the content of a sentence from a video by using the sentence as a query.

Figure 1:
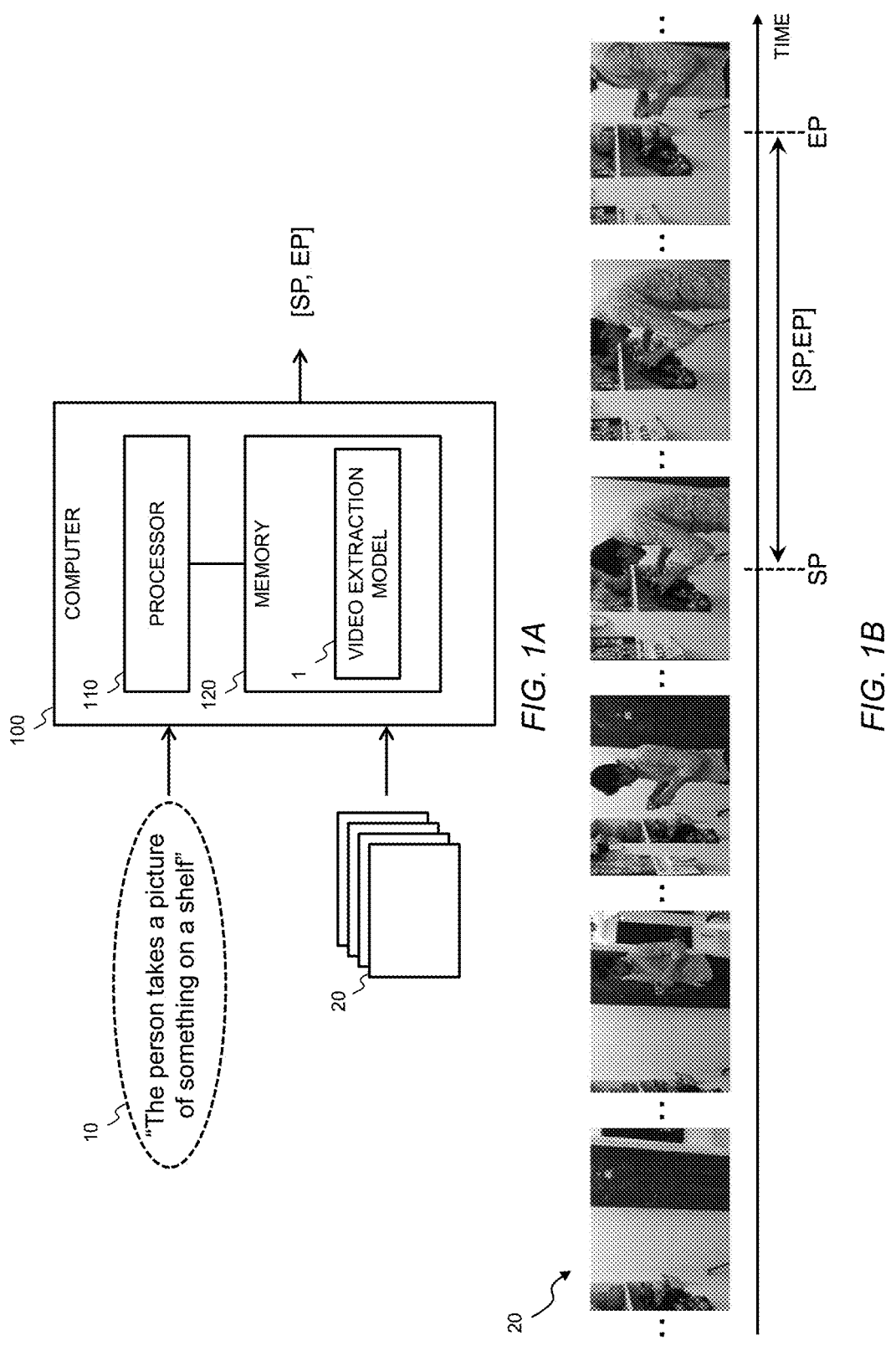
FIG. 1A is a diagram for explaining the outline of the function of a video extraction model according to the present embodiment.
FIG. 1B is a diagram for explaining the outline of the function of a video extraction model according to the present embodiment.

FIG. 1A and FIG. 1B are diagrams for explaining an outline of functions of a video extraction model 1 according to the present embodiment.

The video extraction model 1 according to the present embodiment functions by processing executed by the computer 100. The computer 100 includes one or more processors 110 (hereinafter, simply referred to as "processor 110" or "processing circuitry") and one or more memories 120 (hereinafter, simply referred to as "memory 120"). The processor 110 executes various processes. The memory 120 is connected to the processor 110 and stores various kinds of information necessary for the processor 110 to execute processing. The processor 110 is configured by, for example, a central processing unit (CPU) including an arithmetic device, a register, and the like. The memory 120 is configured by a recording medium such as a read only memory (ROM), a random-access memory (RAM), a hard disk drive (HDD), or a solid-state drive (SSD).

The video extraction model 1 is stored in the memory 120. The processor 110 reads the video extraction model 1 from the memory 120 and executes the processing, thereby realizing the function of the video extraction model 1. The video extraction model 1 may be implemented as a computer program. In particular, the video extraction model 1 may be stored in a computer-readable recording medium.

A sentence 10 (hereinafter, referred to as "input sentence 10") serving as a query and a video 20 serving as a target for extracting a matching interval are input to the video extraction model 1. Then, the video extraction model 1 extracts a matching interval for the input sentence 10 from the video 20. In FIG. 1A, the matching interval is represented by [SP, EP]. The SP is the start time of the matching interval, and the EP is the end time of the matching interval. The video extraction model 1 may be configured to output data of the video 20 corresponding to the matching interval.

FIG. 1B shows an example of a matching interval for the input sentence 10 shown in FIG. 1A. In FIG. 1B, it is understood that the video 20 corresponding to the matching interval matches the content of the input sentence 10. The video extraction model 1 is intended to achieve such a function at the time of inference.

Figure 2:
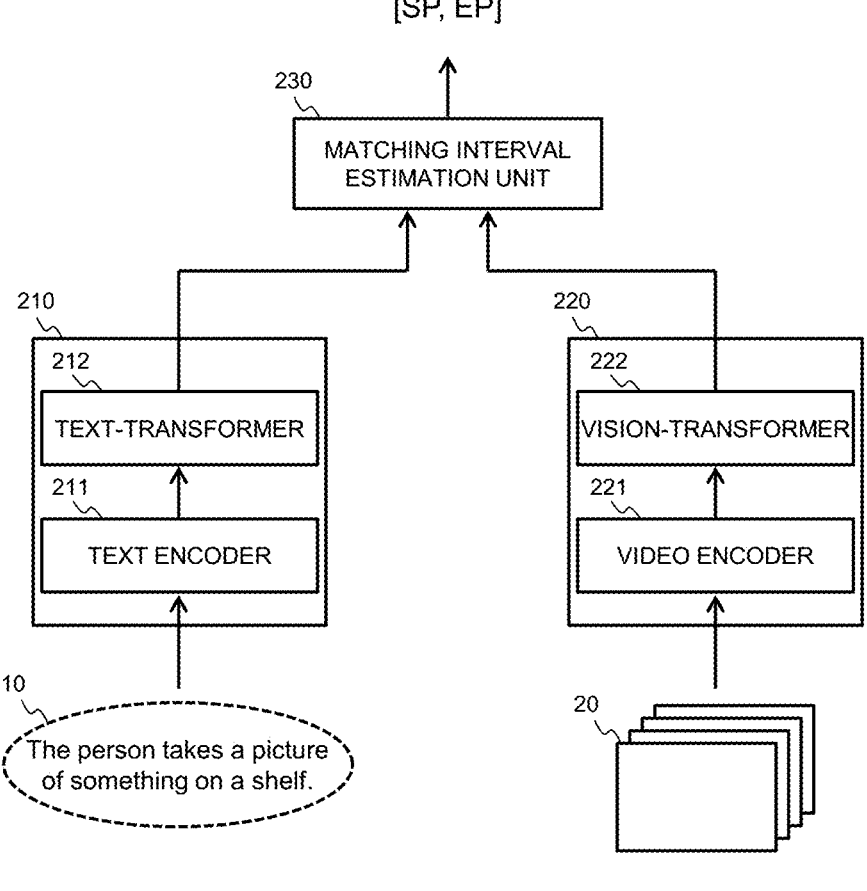
FIG. 2 is a diagram showing an example of a configuration of the video extraction model at the time of inference.

FIG. 2 is a diagram showing an example of the configuration of the video extraction model 1 at the time of inference. The video extraction model 1 includes a sentence feature extraction unit 210, a video feature extraction unit 220, and a matching interval estimation unit 230.

The sentence feature extraction unit 210 is configured by a text encoder 211 and a Text-Transformer 212. The text encoder 211 outputs a distributed representation for each word included in the input sentence 10. The Text-Transformer 212 is a Transformer model that receives the output of the text encoder 211. The output of the Text-Transformer 212 is the output of the sentence feature extraction unit 210.

The video feature extraction unit 220 is configured by a video encoder 211 and a Vision-Transformer 222. The video encoder 211 outputs a feature value for each frame included in the video 20. The Vision-Transformer 222 is a Transformer model that receives the output of the video encoder 211. The output of the Vision-Transformer 222 is the output of the video feature extraction unit 220.

The matching interval estimation unit 230 estimates a matching interval from the output of the sentence feature extraction unit 210 and the output of the video feature extraction unit 220. The matching interval estimation unit 230 can be configured by, for example, a Transformer model and a fully connected layer. In this case, the mutual attention between the output of the sentence feature extraction unit 210 and the output of the video feature extraction unit 220 is calculated by the transformer model. Then, a matching interval for the input sentence 10 is calculated by the fully connected layer from the feature value based on the mutual attention. The fully connected layer may be configured to output a degree of matching with the content of the input sentence 10 for each frame of the video 20. In this case, the matching interval is represented by, for example, a normalized distribution for each frame of the video 20. At this time, SP and EP can be given from the center and width of the distribution.

2. Model Generation Method

The model generation method according to the present embodiment generates a video extraction model 1 by performing machine learning. The model generation method according to the present embodiment is executed by the computer 100. The memory 120 may be configured to store a computer program (hereinafter, referred to as a "model generation program") for causing the processor 110 to execute each process in the model generation method according to the present embodiment. In this case, the processor 110 reads and executes the model generation program, thereby realizing the model generation method and the model generation system according to the present embodiment.

Figure 3:
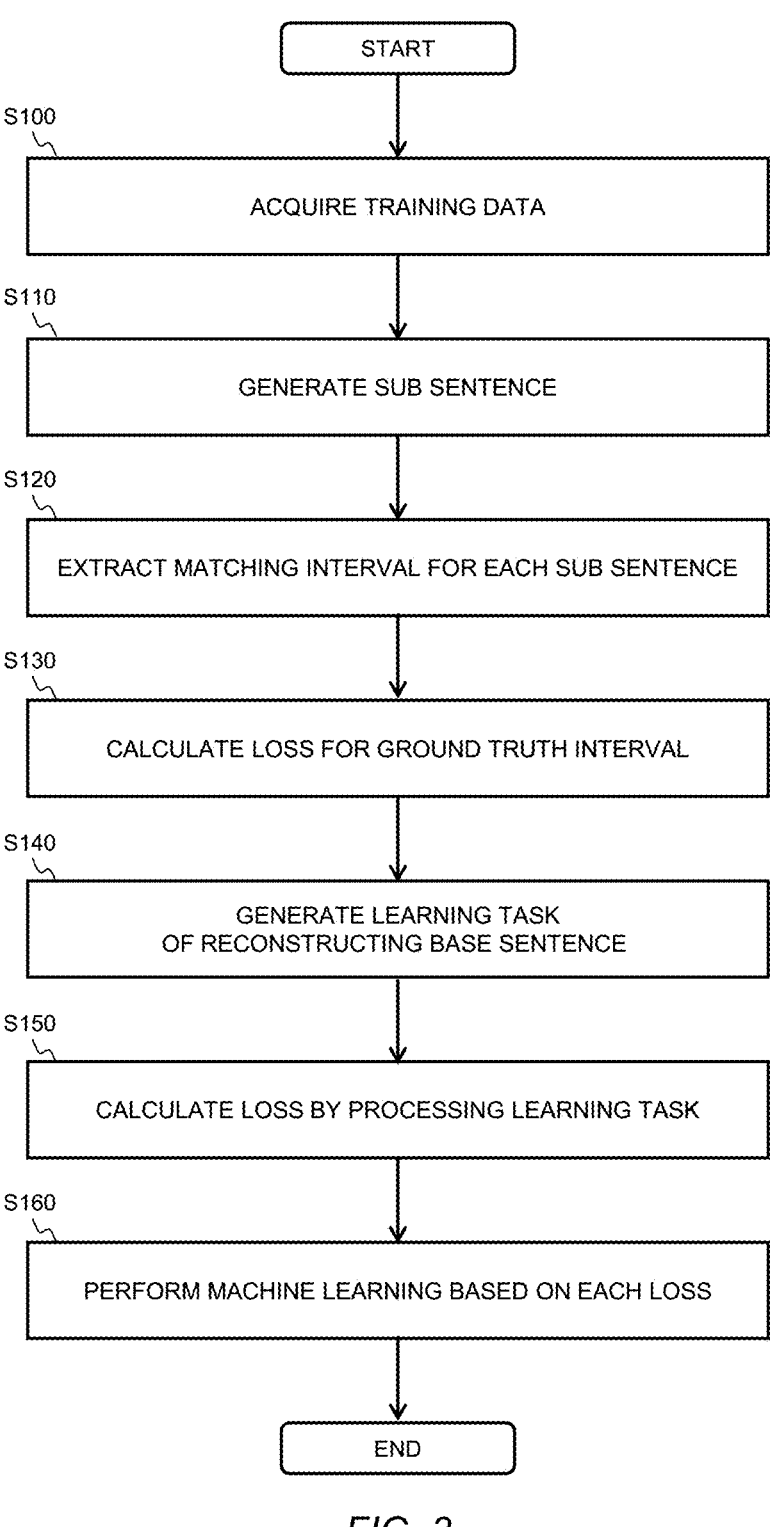
FIG. 3 is a flowchart showing a model generation method according to the present embodiment.

Hereinafter, the model generation method according to the present embodiment will be described with reference to FIG. 3. FIG. 3 is a flowchart showing the model generation method according to the present embodiment.

In step S100, the processor 110 acquires training dataset. The training data is configured by a combination of a sentence for training (hereinafter, referred to as a "base sentence"), a video for training (hereinafter, referred to as a "training video"), and a ground truth interval that gives a correct answer of a matching interval with respect to the base sentence. The computer 100 may be configured to acquire training data via a user interface or communication and store the acquired training data in the memory 120. The training data may include a plurality of data of combinations of the base sentence, the training video, and the ground truth interval. The following description will be made focusing on one combination.

Next, in step S110, processor 110 generates a sub-sentence that is shorter than the base sentence. In the present embodiment, the sub-sentence is generated so as to include both a positive sub sentence that includes a word included in the base sentence (hereinafter, referred to as an "extracted word") but does not include a word unrelated to the base sentence (hereinafter, referred to as a "noise word") and a negative sub sentence that includes at least the noise word. In particular, in the present embodiment, the negative sub sentence is generated to include a first negative sub sentence including both the extracted word and the noise word and a second negative sub sentence including the noise word without including the extracted word. However, the sub-sentence may be generated so as to include at least one of the positive sub sentence and the negative sub sentence. The sub-sentence can be considered as a sentence obtained by decomposing a part of the contents of the base sentence 11.

Here, the noise word may be, for example, a word included in a separate sentence acquired as training data. Alternatively, the noise word may be managed as data stored in the memory 120.

Figure 4A:
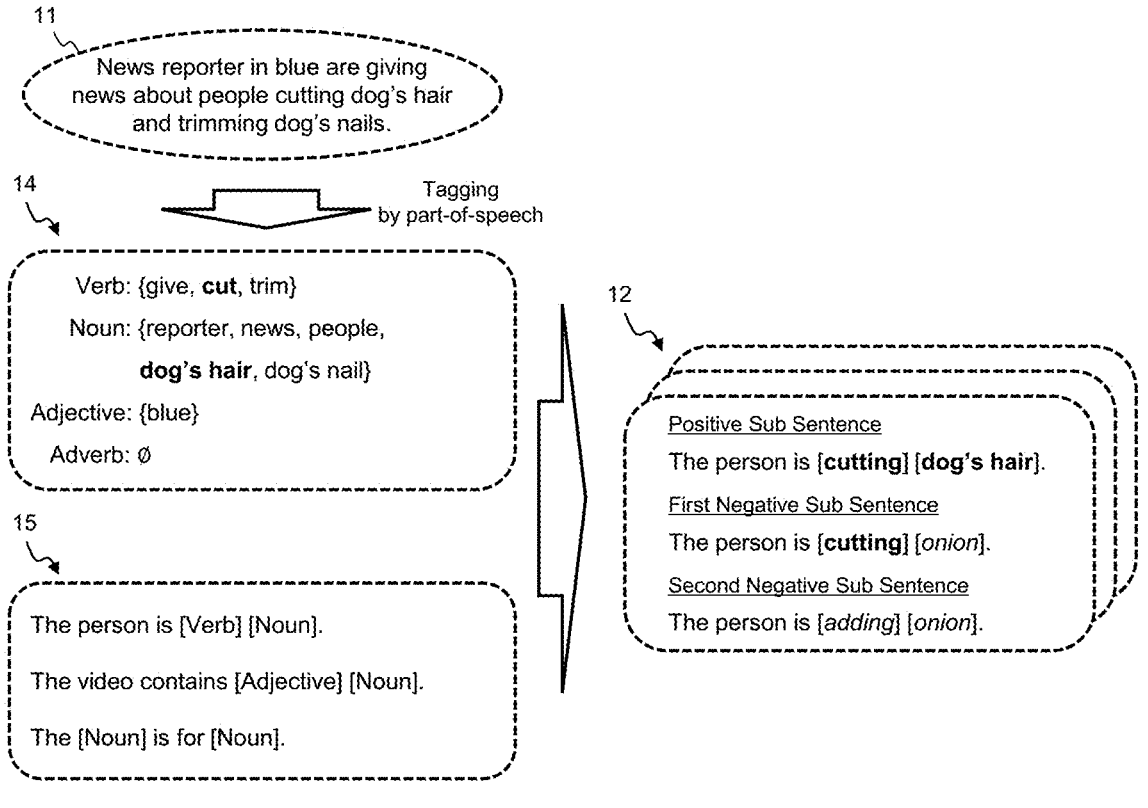
FIG. 4A is a diagram showing an example of processing executed in the model generation method according to the present embodiment.

The processor 110 may perform the process of generating a sub-sentence as follows. FIG. 4A is a diagram illustrating an example of a process of generating the sub sentence 12. In the example shown in FIG. 4A, the sub sentence 12 is generated from the base sentence 11 and the fill-in-the-blank sentence 15 in which some words are missing. The fill-in-the-blank sentence 15 is composed of a template portion in which a specific word is set and a fill-in portion indicating a position where a word is missing. In the filling portion, the part of speech of the missing word is defined. In FIG. 4A, three fill-in-the-blank sentence 15 are shown. For example, in "The person is [Verb] [Noun].", the template part is "The", "person", and "is", and the filling part is [Verb] and [Noun]. The fill-in-the-blank sentence 15 may be configured to be learned. For example, the words set in the template portion may be expressed by tokens that can be learned. Thus, an optimum template portion can be constructed through learning.

First, the processor 110 tags each extracted word in the base sentence 11 with a part of speech. FIG. 4A shows an example of the extracted word 14 tagged with the part-of-speech.

Then, the processor 110 completes the fill-in-the-blank sentence 15 by using the extracted word 14 or the noise word corresponding to the word class defined in the fill-in portion, thereby generating the sub sentence 12. Specifically, the processor 110 may generate a positive sub sentence by completing the fill-in-the-blank sentence 15 using only the extracted word 14. The processor 110 can generate the first negative sub sentence by completing the fill-in-the-blank sentence 15 using both the extracted word 14 and the noise word. The processor 110 may generate a second negative sub sentence by completing the fill-in-the-blank sentence 15 using only the noise words.

FIG. 4A shows an example of the sub sentence 12 generated when the extracted words 14 are "cut" and "dog's hair" and the noise words are "add" and "onion" for "The person is [Verb] [Noun].". The extracted word 14 corresponding to the part of speech defined in the filling portion or the noise word may be selected at random. The processor 110 may generate a plurality of positive sub scents, a plurality of first negative sub scents, or a plurality of second negative sub scents.

Refer to FIG. 3 again. Next, in step S120, the processor 110 inputs the base sentence 11 and each of the generated sub sentences 12 to the video extraction model 1, and extracts a plurality of matching intervals for each sentence from the training video. That is, in the present embodiment, the plurality of matching intervals includes a base matching interval estimated for the base sentence 11, a positive sub matching interval estimated for the positive sub sentence, a first negative sub matching interval estimated for the first negative sub sentence, and a second negative sub matching interval estimated for the second negative sub sentence.

Next, in step S130, the processor 110 calculates a loss with respect to the ground truth interval based on the base matching interval. In detail, the processor 110 calculates a regression loss $L_{reg}$ according to a difference between the base matching interval and the ground truth interval.

Figure 4B:
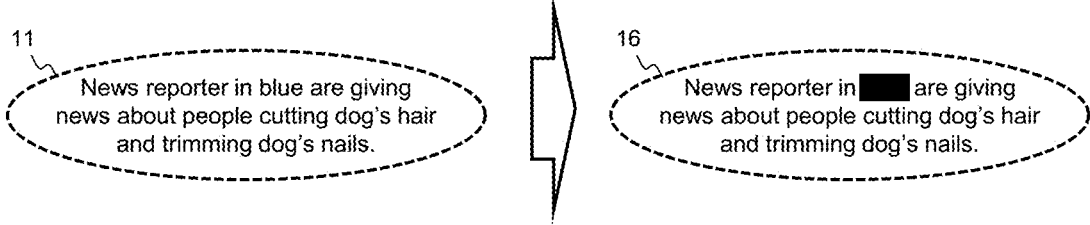
FIG. 4B is a diagram showing an example of processing executed in the model generation method according to the present embodiment.

Next, in step S140, the processor 110 generates a learning task for reconstructing the base sentence 11. For example, the processor 110 masks some words in the base sentence 11 to generate a learning task for reconstructing the masked words. FIG. 4B shows an example of the generated learning task 16. In FIG. 4B, "blue" in the base sentence 11 is masked to generate a learning task 16. In this case, the number of words to be masked may be plural. For example, the learning task 16 may be generated by masking 30% of random words in the base sentence 11. The learning task 16 is a self-supervised learning task because it is generated from the base sentence 11.

Next, in step S150, the processor 110 calculates a loss for each matching interval by processing the learning task 16 based on the feature value of the training video corresponding to each matching interval. The feature value of the training video corresponding to the matching interval is calculated by, for example, weighting the feature value of the training video according to the matching interval. When the matching interval is calculated by the distribution for each frame, the weighting can be performed by multiplying the feature value of each frame of the training video by the value of the corresponding distribution. Alternatively, the feature value of the training video corresponding to the matching interval is the feature value of the training video included in the matching interval. The loss is given according to the error of the reconstructed base sentence 11. For example, when processing the learning task 16 for reconstructing the masked word, the loss can be calculated by the cross-entropy error. That is, in this case, the loss indicates the inference error of the masked word.

Figure 5:
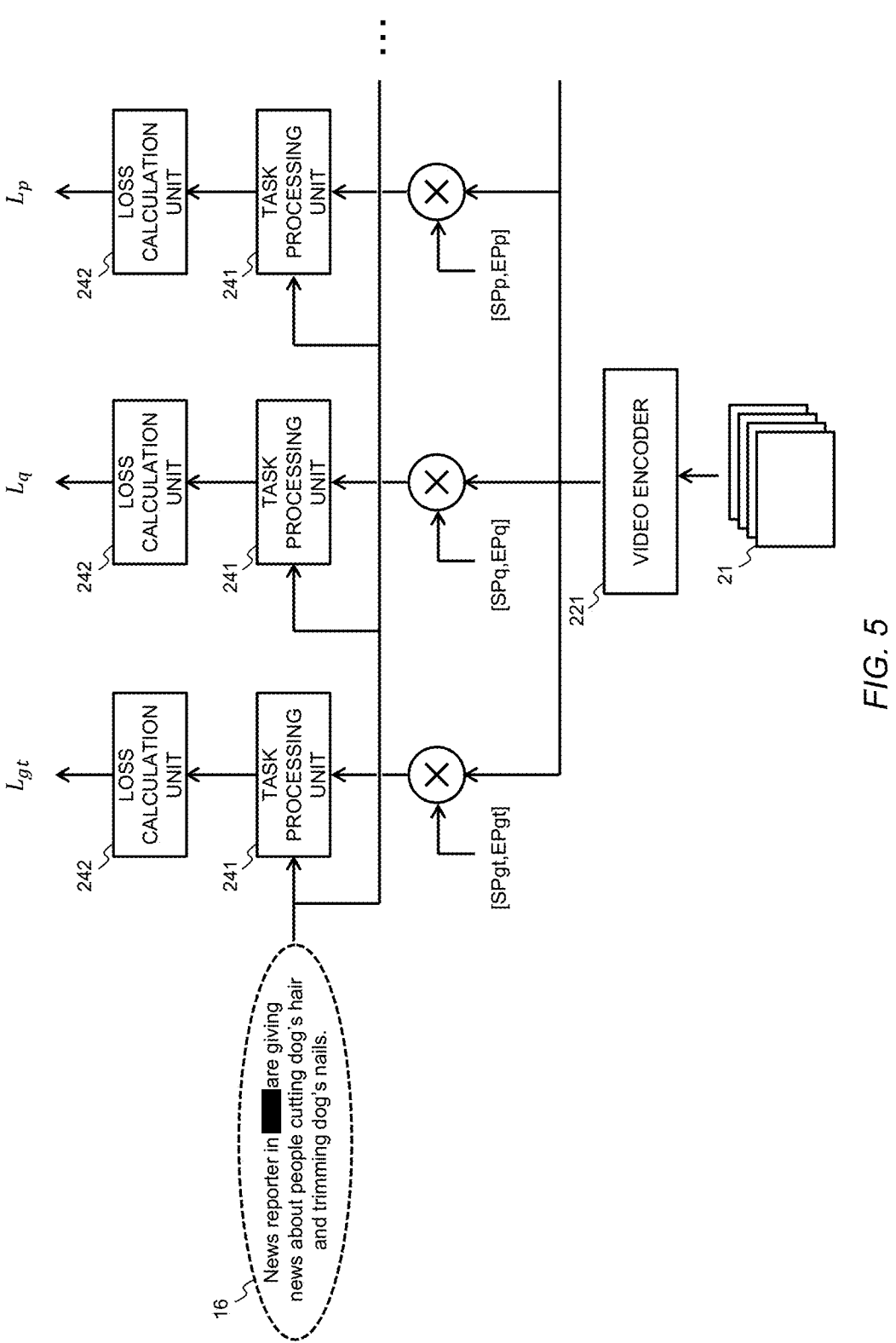
FIG. 5 is a diagram showing an example of processing executed in the model generation method according to the present embodiment.

FIG. 5 is a diagram illustrating an example of a configuration of a process related to step S150. In FIG. 5, [SPgt, EPgt], [SPq, EPq], and [SPp, EPp] respectively represent a ground truth interval, a base matching interval, and a positive sub matching interval. In FIG. 5, the first negative sub matching interval and the second negative sub matching interval are not shown.

The feature values of the training video 21 acquired by the video encoder 211 are weighted according to each matching interval. Accordingly, the feature values of the training video 21 corresponding to the ground truth interval, the base matching interval, the positive sub matching interval, the first negative sub matching interval, and the second negative sub matching interval are acquired.

The task processing unit 241 processes the learning task 16 based on the feature value of the training video 21 corresponding to each matching interval. The task processing unit 241 may have a suitable configuration according to the contents of the learning task 16. For example, when the learning task 16 for reconstructing a masked word is processed, the task processing unit 241 can be configured by a transformer model and a fully connected layer. In this case, the mutual attention between the feature value of the training video 21 corresponding to the matching interval and each word included in the masked base sentence 11 is calculated by the transformer model. Then, an inference result of the word masked by the fully connected layer is calculated from the feature value based on the mutual attention.

The loss calculation unit 242 calculates a loss from each processing result of the task processing unit 241. To be specific, a loss (hereinafter, referred to as a "first loss") Let is calculated from the processing result of the learning task 16 based on the feature value of the training video 21 according to the ground truth interval. Similarly, a loss (hereinafter, referred to as a "second loss") $L_q$ is calculated from the processing result of the learning task 16 based on the feature value of the training video 21 corresponding to the base matching interval. Similarly, a loss (hereinafter, referred to as a "positive sub loss") $L_p$ is calculated from the processing result of the learning task 16 based on the feature value of the training video 21 corresponding to the positive sub matching interval. Similarly, a loss (hereinafter, referred to as "first negative sub loss") Le is calculated from the processing result of the learning task 16 based on the feature value of the training video 21 corresponding to the first negative sub matching interval. Similarly, a loss (hereinafter, referred to as a "second negative sub loss") Lo is calculated from the processing result of the learning task 16 based on the feature value of the training video 21 corresponding to the second negative sub matching interval.

Refer to FIG. 3 again. Next, in step S160, the processor 110 performs machine learning of the video extraction model 1 based on the calculated losses. To be more specific, the processor 110 performs machine learning so as to reduce a loss function L of the following equation. L is composed of a linear sum of three loss functions, $L_{reg}$, $L_{rec}$, and $L_{rank}$. That is, decreasing L means decreasing each of $L_{reg}$, $L_{rec}$, and $L_{rank}$. Λreg, λrec, and λ rank are hyperparameters that define the contribution of each loss function to L.

$$L = \lambda_{reg} * L_{reg} + \lambda_{rec} * L_{rec} + \lambda_{rank} * L_{rank} \qquad \text{Formula 1}$$

As described above, $L_{reg}$ is a regression loss according to a difference between the base matching interval and the ground truth interval. That is, performing machine learning so as to reduce $L_{reg}$ means supervised learning related to the ground truth interval.

$L_{rec}$ is configured using the first loss, the second loss, or the positive sub loss. For example, $L_{rec}$ is the sum of the first loss, the second loss, and the positive sub loss. The loss calculated by processing the learning task 16 is one of the indexes for measuring the semantic relevance between the training video 21 of the matching interval and the base sentence 11. This is because it is considered that the higher the semantic relevance between the training video 21 of the matching interval and the base sentence 11 is, the higher the accuracy of the base sentence 11 reconstructed from the training video 21 of the matching interval is. Therefore, by performing machine learning so as to reduce $L_{rec}$, the video extraction model 1 can be learned so that the semantic relevance between the input sentence 10 and the estimated matching interval increases.

$L_{rank}$ is configured by each loss calculated by processing the learning task 16. In particular, $L_{rank}$ is configured to define the magnitude of each loss. Specifically, $L_{rank}$ may be configured using the following formula. m0, m1, m2, and m3 are constants that provide a predetermined margin.

$$L_{rank} = \max(L_{gt} - L_q + m_0, 0) + \max(L_q - L_p + m_1, 0) + \qquad \text{Formula 2}$$
$$\max(L_p - L_c + m_2, 0) + \max(L_c - L_o + m_3, 0)$$

The first term enables learning of the video extraction model 1 so that the first loss is smaller than the second loss. The second term enables learning of the video extraction model 1 so that the second loss is smaller than the positive sub loss. Further, the third term enables learning of the video extraction model 1 so that the positive sub loss is smaller than the first negative sub loss. The fourth term enables learning of the video extraction model 1 so that the first negative sub loss is smaller than the second negative sub loss.

Since $L_{rank}$ includes each sub-loss for each sub-matching interval, decreasing $L_{rank}$ means increasing the semantic relevance of the matching interval estimated for some content of the base sentence 11. Furthermore, $L_{rank}$ can hierarchically give the degree of relevance of each training video 21 of the ground truth interval, the base matching interval, and each sub-matching interval to the base sentence 11. Thus, the video extraction model 1 can be learned so that the magnitude relation of the semantic relevance of each matching interval becomes a valid relation. Therefore, by performing machine learning so as to reduce $L_{rank}$, the video extraction model 1 can be learned so as to also focus on a part of the content of the input sentence 10.

In the $L_{rank}$, the third term or the fourth term may be omitted. In this case, the calculation cost in learning can be improved by a trade-off with the estimation accuracy of the matching interval. In this case, $L_p$ in the second term may be changed according to the sub-sentence to be generated. For example, when only the first negative sub sentence is generated, $L_p$ of the second term may be set to Lc.

Figure 6:
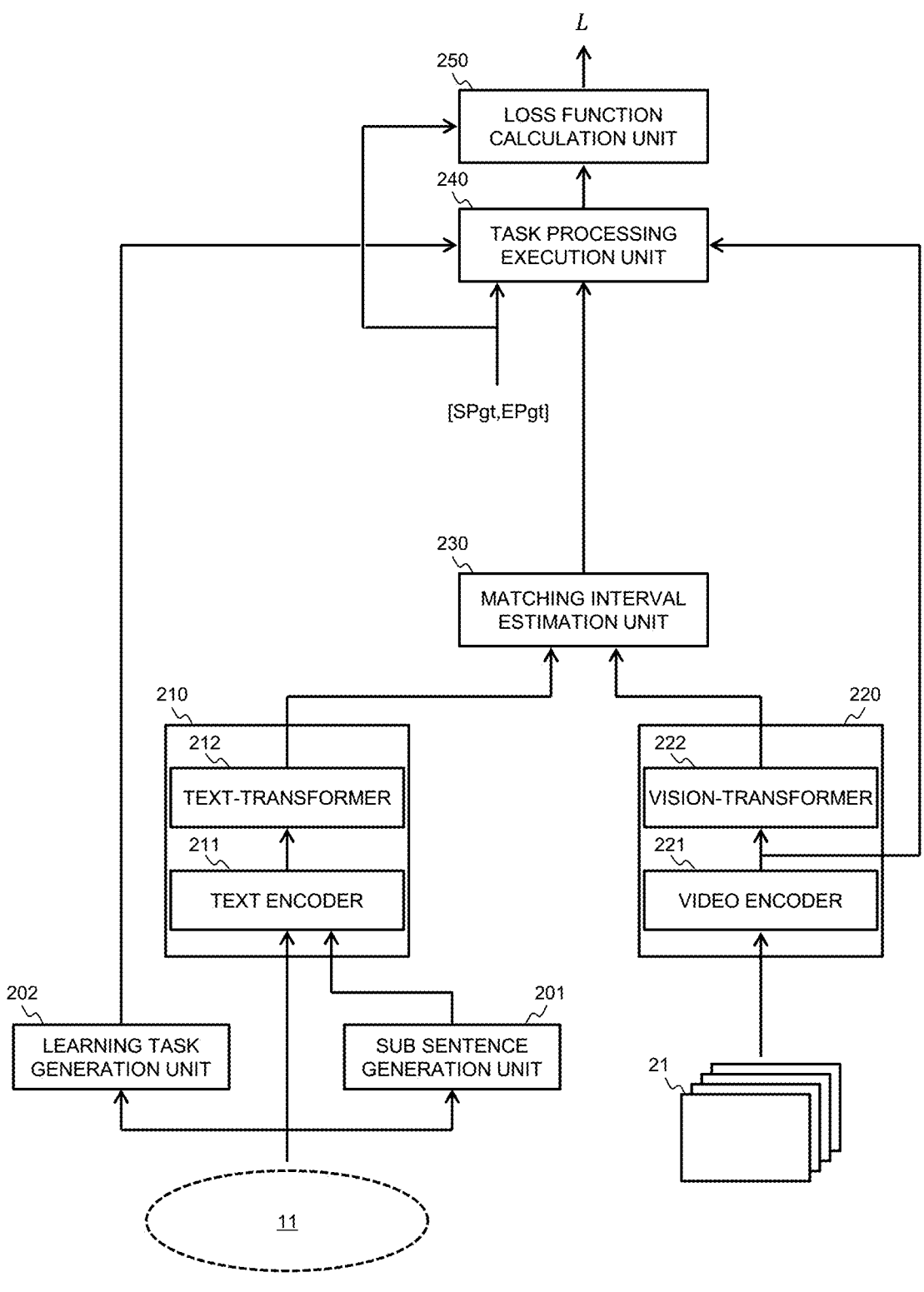
FIG. 6 is a diagram showing an example of the configuration of the video extraction model at the time of training.

As described above, the processor 110 performs machine learning. The machine learning may be performed by backpropagation. FIG. 6 is a diagram illustrating an example of a configuration of the video extraction model 1 at the time of learning.

The sub sentence generation unit 201 generates a sub sentence from the base sentence 11. The learning task generation unit 202 generates a learning task 16 from the base sentence 11. The task processing execution unit 240 calculates each loss by processing the learning task 16 based on the feature value of the training video 21 corresponding to each matching interval. The loss function calculation unit 250 calculates a loss function L.

3. Effect

As described above, according to the present embodiment, the video extraction model 1 can be learned so that the semantic relevance between the input sentence 10 and the estimated matching interval is increased. Furthermore, even when attention is paid to a part of the contents of the input sentence 10, the video extraction model 1 can be learned so that the semantic relevance is increased. As a result, video extraction model 1 having high generalization performance can be generated for various input sentence 10.

What is claimed is:

1. A model generation method for generating a video extraction model for extracting a matching interval in a video that matches contents of an input sentence, the model generation method, which is executed by a computer, comprising inputting a plurality of sentences into the video extraction model and extracting a plurality of matching intervals in a training video with respect to the plurality of sentences, wherein the plurality of sentences includes a base sentence and at least one sub sentence shorter than the base sentence, the at least one sub sentence includes at least one of a positive sub sentence and a negative sub sentence, the positive sub sentence including a word included in the base sentence and not including a noise word unrelated to the base sentence, the negative sub sentence including at least the noise word, the plurality of matching intervals includes a base matching interval corresponding to the base sentence and at least one sub matching interval corresponding to the at least one sub sentence, and the model generation method further comprises:

calculating a first loss by processing a learning task of reconstructing the base sentence based on a feature value of the training video corresponding to a ground truth interval;

calculating a second loss by processing the learning task based on the feature value of the training video corresponding to the base matching interval;

calculating at least one sub loss by processing the learning task based on the feature value of the training video corresponding to the at least one sub matching interval; and performing machine learning of the video extraction model such that the first loss is smaller than the second loss and the second loss is less than the at least one sub loss.

2. The model generation method according to claim 1, wherein the at least one sub sentence includes both the positive sub sentence and the negative sub sentence, the at least one sub matching interval includes a positive sub matching interval corresponding to the positive sub sentence and a negative sub matching interval corresponding to the negative sub sentence, the at least one sub loss includes a positive sub loss and a negative sub loss, the positive sub loss calculated by processing the learning task based on the feature value of the training video corresponding to the positive sub matching interval, the negative sub loss calculated by processing the learning task based on the feature value of the training video corresponding to the negative sub matching interval, and the performing the machine learning is further implemented such that the positive sub loss is smaller than the negative sub loss.

3. The model generation method according to claim 2, wherein the negative sub sentence includes a first negative sub sentence and a second negative sub sentence, the first negative sub sentence including both a word included in the base sentence and the noise word, the second negative sub sentence not including a word included in the base sentence and including the noise word, the negative sub matching interval includes a first negative sub matching interval corresponding to the first negative sub sentence and a second negative sub matching interval corresponding to the second negative sub sentence, the negative sub loss includes a first negative sub loss and a second negative sub loss, the first negative sub loss calculated by processing the learning task based on the feature value of the training video corresponding to the first negative sub matching, the second negative sub loss calculated by processing the learning task based on the feature value of the training video corresponding to the second negative sub matching interval, and the performing the machine learning is further implemented such that the first negative sub loss is smaller than the second negative sub loss.

4. The model generation method according to claim 1, wherein the learning task is generated by masking a word in the base sentence and is a task of inferring the masked word.

5. A model generation system for generating a video extraction model for extracting a matching interval in a video that matches contents of an input sentence, the model generation system comprising processing circuitry configured to execute inputting a plurality of sentences into the video extraction model and extracting a plurality of matching intervals in a training video with respect to the plurality of sentences, wherein the plurality of sentences includes a base sentence and at least one sub sentence shorter than the base sentence, the at least one sub sentence includes at least one of a positive sub sentence and a negative sub sentence, the positive sub sentence including a word included in the base sentence and not including a noise word unrelated to the base sentence, the negative sub sentence including at least the noise word, the plurality of matching intervals includes a base matching interval corresponding to the base sentence and at least one sub matching interval corresponding to the at least one sub sentence, and the processing circuitry is further configured to execute:

calculating a first loss by processing a learning task of reconstructing the base sentence based on a feature value of the training video corresponding to a ground truth interval;

calculating a second loss by processing the learning task based on the feature value of the training video corresponding to the base matching interval;

calculating at least one sub loss by processing the learning task based on the feature value of the training video corresponding to the at least one sub matching interval; and performing machine learning of the video extraction model such that the first loss is smaller than the second loss and the second loss is less than the at least one sub loss.

* * * * *